United States Patent [19]

Camboulives et al.

[11] 4,373,421
[45] Feb. 15, 1983

[54] EMERGENCY AEROSOL LUBRICATION DEVICE, PARTICULARLY FOR AIRBORNE ENGINES

[75] Inventors: André A. M. L. Camboulives, Savigny sur Orge; Pierre Debeneix, Saint Sauveur sur Ecole; Claude V. L. Gendronneau, Fontainebleau; Roger P. Hugnet, Paris, all of France

[73] Assignee: Societe Nationale d'Etude et de Construction de Moteurs d'Aviation (S.N.E.C.M.A.), Paris, France

[21] Appl. No.: 187,069

[22] Filed: Sep. 15, 1980

[30] Foreign Application Priority Data

Sep. 17, 1979 [FR] France .................. 79 23488

[51] Int. Cl.³ .............................. F01M 1/18
[52] U.S. Cl. ........................ 184/6.4; 60/39.08; 184/6.12
[58] Field of Search .............. 184/6.4, 6.26, 6.11, 184/6.13, 55 R, 55 A; 60/39.08

[56] References Cited

U.S. PATENT DOCUMENTS

| | | | |
|---|---|---|---|
| 2,776,025 | 1/1957 | Schweisthal | 184/55 A |
| 2,886,133 | 5/1959 | Mouck et al. | 184/6.26 |
| 2,934,168 | 4/1960 | Klompas | 184/6.26 |
| 3,384,103 | 5/1968 | Lansky | 184/55 A X |
| 3,543,879 | 12/1970 | Munn et al. | 184/626 |
| 4,066,146 | 1/1978 | Gresh | 184/1 R |
| 4,153,141 | 5/1979 | Methlie | 184/6.4 X |
| 4,284,174 | 8/1981 | Salvana et al. | 184/6.4 |

FOREIGN PATENT DOCUMENTS

| | | |
|---|---|---|
| 1100689 | 4/1955 | France . |
| 1124827 | 7/1956 | France . |
| 165255 | 6/1921 | United Kingdom . |
| 1514576 | 6/1978 | United Kingdom . |

*Primary Examiner*—David H. Brown
*Attorney, Agent, or Firm*—Oblon, Fisher, Spivak, McClelland & Maier

[57] ABSTRACT

An emergency aerosol lubrication device, particularly for airborne engines which includes a mechanism for placing a certain quantity of oil in reserve, an operator-controlled mechanism for atomizing oil in an aerosol container, which is connected to the points to be lubricated, a member for supplying the atomization mechanism with oil drawn from the reserve, and a mechanism for keeping the reserve oil at a suitable temperature.

4 Claims, 3 Drawing Figures

EMERGENCY AEROSOL LUBRICATION DEVICE, PARTICULARLY FOR AIRBORNE ENGINES

BACKGROUND OF THE INVENTION

1. Field of the Invention

The present invention concerns an emergency aerosol lubrication device, particularly for airborne engines.

2. Summary of the Invention

The aim of the invention is particularly to set forth a device enabling redressment of possible failure of the lubrication system of an airplane engine due to accidental drainage in flight.

This goal is attained under the invention due to the fact that the device includes a mechanism for placing a certain quantity of oil in a reserve, operator-controlled mechanism for atomizing oil in a container called an aerosol container connected to the points to be lubricated, a so-called feed member for supplying the atomization mechanism with oil drawn from the reserve, and a member for maintaining the reserve oil at an appropriate temperature for lubrication of said points, so that, in case of accidental oil drainage from the main lubricating unit, the operator may be sure of having emergency lubrication for a certain time.

Advantageously, the reserve storage member includes a closed compartment, called the reserve, enclosed by sides, of which at least a marginal upper portion is essentially oil-tight under low pressure, and a mechanism for admitting oil into the compartment, so that a reversal in the direction of the acceleration of gravity does not cause drainage of oil out of the compartment. The feed member includes at least one so-called feed conduit opening into the lower end of the reserve compartment.

The aerosol container is disposed above the reserve compartment, and the lower wall of the container has a depression at the lower point of which opens a conduit called the recovery conduit, the other end of which opens into the lower end of the reserve compartment, so that non-atomized oil coming from the atomization mechanism flows into the depression and, from there, into the reserve compartment via the recovery conduit.

Advantageously, the reserve compartment is only partially filled with oil so as to leave, at its upper end, a volume of air enabling the oil to expand without damaging the compartment.

The aerosol container is in permanent communication with the upper end of the reserve compartment by means of a communication line the cross-section of which is sufficiently small to prevent substantial leaks of oil out of the compartment in case of reversal of the direction of the acceleration of gravity, with the line enabling the reserve compartment to be placed at the same pressure as the aerosol container, so that a movement of oil is obtained from the container towards the atomization mechanism in the feed tube.

The reserve compartment is in permanent communication with the aerosol container through a connection conduit opening into the container, on the one hand, and, on the other, into the lower end of the compartment, and this compartment, which is in series with the container, forms a branch of the oil circuit of the main lubrication unit, so that such compartment is constantly crossed by the oil of the main unit and the oil it contains is kept at the appropriate temperature. The recovery conduit is also the connection conduit. The reserve compartment is subdivided into two superimposed chambers, interconnected by a valve. The feed conduit opens into the lower chamber and the upper chamber is connected to the aerosol container by a line, in which is placed a second valve. The first and second valves include a single clack valve, whose movement in the open position of the valves is controlled by the activation of the atomization mechanism.

Other characteristics and advantages of the invention will be better understood in reading the following description of two example embodiments and referring to the attached drawings, in which:

DETAILED DESCRIPTION OF THE PREFERRED EMBODIMENTS

In order to compensate for failure of the lubrication system or unit of an airplane engine, e.g., following accidental in-flight drainage of the oil reservoir R of said system, an emergency aerosol lubrication system capable of ensuring satisfactory lubrication for a limited time, e.g., approximately 20 minutes, has been provided. This period of time is judged sufficient to enable the aircraft to be brought back to the ground undamaged.

As will be explained below, this emergency system employs an oil reserve and must respond to the following imperatives:

(1) it must be able to operate normally over a temperature range of from $-40°$ to $+200°$ C.;

(2) it must be leak-tight, i.e., it must not allow the reserve oil to flow back into the regular lubrication circuit during so-called "negative g" flight (i.e., flight with a downward acceleration which is greater than the force of gravity) or in inverted flight (upside-down);

(3) it must enable expansion of the oil, when warm, on the order of 20%.

Figure 1:
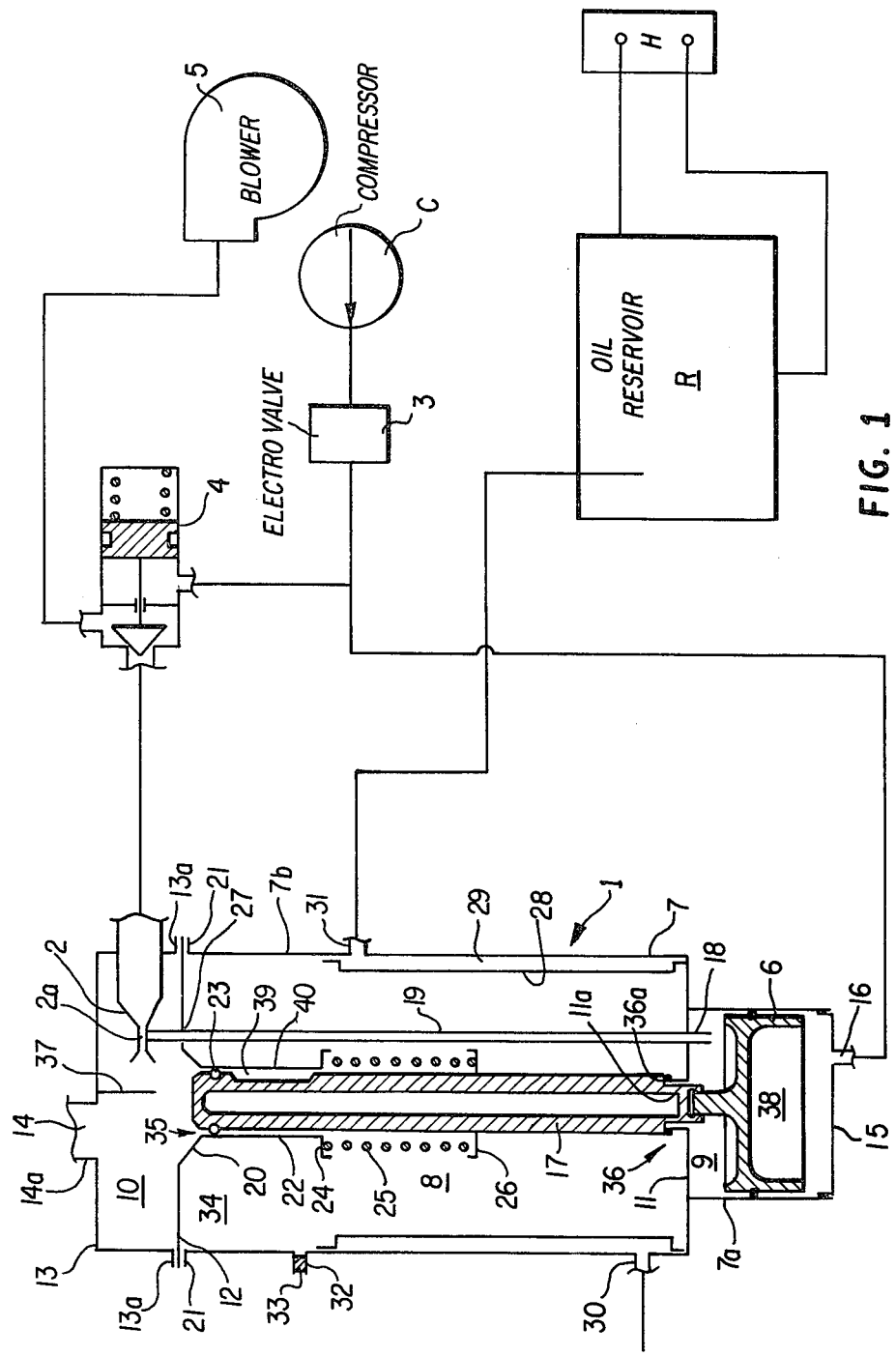
FIG. 1 is a diagram of a device according to one embodiment of the invention.

For these purposes, the unit represented in FIG. 1 is composed particularly of the following elements:

(a) a capacity typically capable of containing approximately one liter of oil, such capacity being constructed by means of a container 1 including various connections and, at its upper part, an atomization nozzle 2;

(b) an electrovalve 3 controlled by the pilot of the aircraft and capable of simultaneously triggering the opening of a gate 4 supplying nozzle 2 with pressurized air from the outlet of a compressor 5, and the feeding of pressurized air (furnished by compressor C) to a piston called opening piston 6 provided at the base of container 1;

(c) a system H for reheating the oil contained in container 1 (this system will be described below).

Container 1 itself includes the following elements inter alia:

a hollow body 7 made of light alloy, the inside area of which is separated into three chambers 8, 9 and 10 by interior partitions 11 and 12;

a cap 13 including atomization nozzle 2 and an outlet 14 for the oil mist atomized by the nozzle;

a bottom 15 incorporating an air intake connection 16 for control of piston 6.

Body 7 is cylindrical in shape and includes:

interior partition 11, e.g., cast with body 7. Partition 11 comprises a bore 11a in which slides a tube 17 which plays the role of clack valve, as will be explained below. Interior partition 11 also includes a hole 18 through which a tube 19 passes in leak-tight manner, supplying nozzle 2 with oil;

within the lower part 7a of body 7, piston 6 slides axially. Part 7a is sealed tight at the bottom by base 15;

the upper part 7b of body 7 supports a funnel-shaped cap 20 bolted at 21 onto body 7, with the cap constituting above-mentioned interior partition 12.

Cap 20 includes a tube 22 which forms a bore within which clack valve/tube 17 slides, over at least one ring gasket 23.

The base of tube 22 of funnel 20 includes a circular machining, or flange 24, serving as a rest for a coil spring 25 which, at its other end presses against a collar 26 on clack valve/tube 17. Spring 25 is calculated to hold clack valve/tube 17 in closed position, even under so-called "negative g" conditions. This closed position corresponds to the mutually sealed isolation of chambers 8, 9 and 10.

Interior partition 12 also includes a hole 27 in which tube 19 is sealed, with tube 19 being designed to bring oil to atomization nozzle 2.

Body 7 also includes a sleeve 28 which, together with body 7 itself, forms an annular, cylindrical space 29 which communicates with two connections:

a connection 30 for admission of warming oil (from the main oil circuit);

a connection 31 for exiting of the warming oil.

Finally, body 7 also includes a filling and overflow boss 32 which is normally closed by a plug 33, such connection being located at a level lower than that of partition 12 so as to provide an expansion space 34 at the top of chamber 8 to allow the oil contained in said chamber to expand. Outer or upper cap 13 is affixed at 13a to body 7 by bolts (not shown). Upper cap 13 includes a nozzle 2 which consists of a venturi having a neck 2a, into which empties oil admission tube 19. Cap 13 further includes a connection 14a, through which the oil mist from nozzle 2 escapes to the lubrication points (not shown).

Tube 17, sliding axially in tubular guides 11a and 22 of body 7, forms two valves 35 and 36 of which one (35) is placed in partition 12, between chambers 8 and 10, and the other (36) is placed in partition 11 between chambers 8 and 9.

The function of the two valves is to assure the pressurization of chambers 8, 9 and 10, and thus to provide a means of returning to chamber 8 the large drops of oil from nozzle 2 which are stopped either by a plate 37 on cap 13 or by the walls of chamber 10. Their function is also to feed venturi 2 through tube 19.

As soon as pressurized air is admitted into the lower chamber 38 of lower cylindrical portion 7a of body 7, it pushes piston 6 upward (see FIG. 1). Piston 6 in turn pushes back tube 17. This has the effect of connecting oil capacity 8 and tube 19, into which the oil rises by aspiration.

In the case of the embodiment of FIG. 1, the supplying or filling of capacity chamber 8 with lubricating oil is done on the ground by maintenance personnel. This capacity typically ensures 20 minutes of flight autonomy.

The operation of the unit in FIG. 1 is as follows. As soon as the "oil failure" indicator lights up on the control panel of the aircraft, the pilot, by means of a switch (not shown), activates electrovalve 3, which has the effect of opening gate 4 feeding venturi 2 with air from compressor 5; of pressurizing bottom chamber 38 of cylinder 7a; and piston 6 pushing tube 17 out of its seat 36a. The oil contained in chamber 8 moves into chamber 9 where it is taken up by tube 19 and drawn by suction to venturi 2. Venturi 2 projects atomized oil onto plate 37, which has the effect of stopping the large drops of oil, which return to reserve 8 through open valve 35, milled passages 39 in tube 17, and openings 40 drilled in tube 22. Only the oil mist (typically constituting 10% of the output of venturi 2) reaches the points to be lubricated.

According to another embodiment (not shown), cap 13 does not include plate 37, and the droplets are stopped at the bottom of the cap.

This emergency aerosol lubrication system is applicable particularly to turbo-engines (airplane jets, turbines, etc.). Therefore, it essentially includes a nozzle 2 supplied with oil from a reserve and with air drawn from a jet or flow of air from compressor 5, and a container containing an oil reserve in its center and a capacity at either end made to communicate through movement of a single clack valve 17.

Clack valve 17 is moved by a piston 6 activated by air drawn from compressor 5. The purpose of this clack valve is to equilibrate the pressures in capacities 9 and 10 located on either side of reserve 8; to supply oil to capacity 9 which feeds atomization nozzle 2; to enable return of excess oil to reserve 8; and to prevent any migration of oil out of container 1 in inverted or "negative g" flight.

When the flight field of the aircraft extends as high as 20,000 meters, it may be feared that the pressure furnished by compressor C will be insufficient at this altitude to overcome the force of spring 25 and that venturi 2 will no longer be supplied with oil. To eliminate this problem, a second embodiment of the aerosol generator described below with reference to FIG. 2 has been produced.

Figure 2:
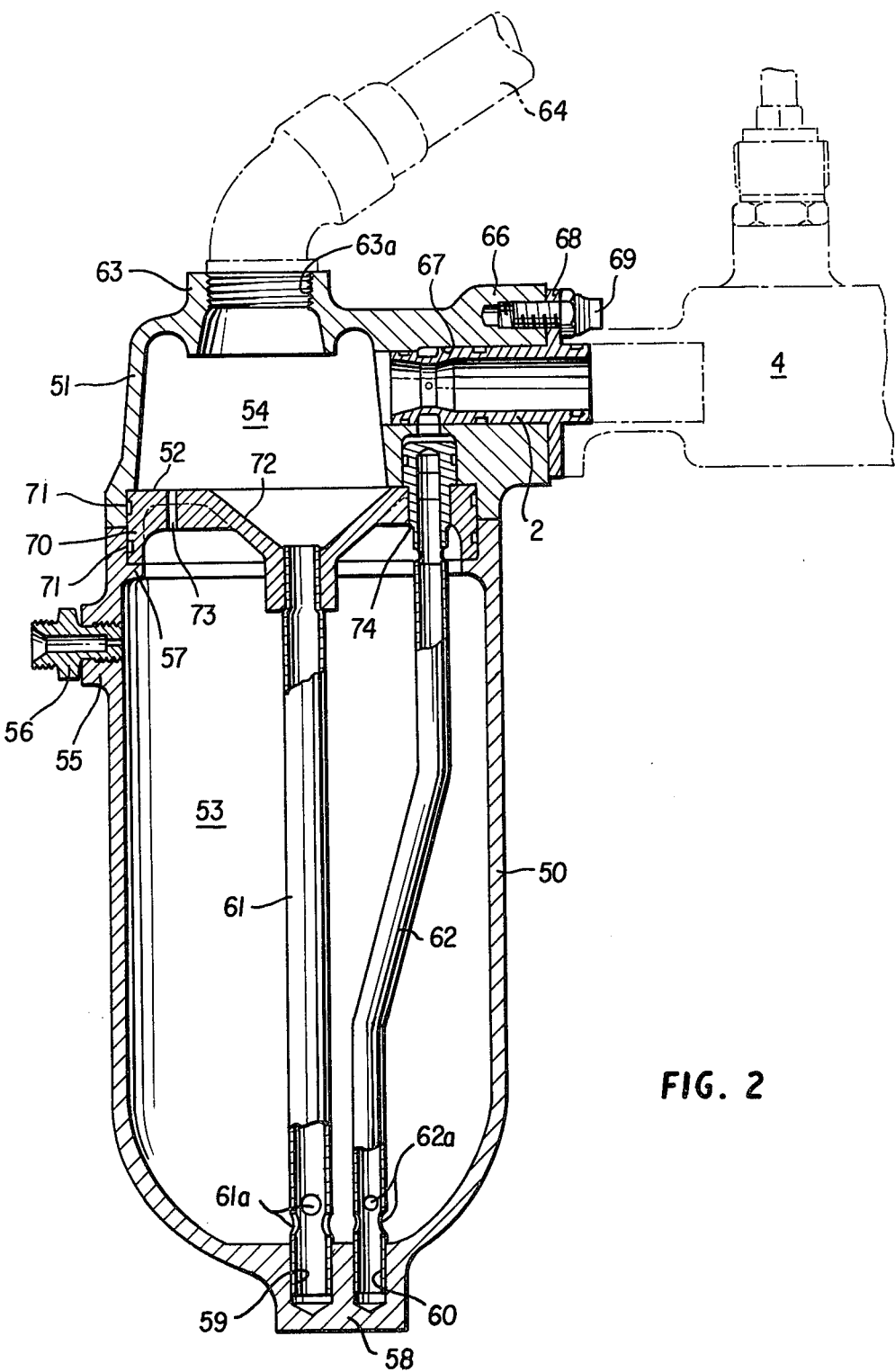
FIG. 2 is a vertical cross-section and elevation of a second embodiment of the invention.

In contrast to the first, the aerosol generator in FIG. 2 has the following advantages:

all components are static, resulting in the lowest cost and in improved reliability;

the generator is lighter;

the oil reserve is continuously recycled; and the generator requires no pre-filling; it is filled automatically at the moment of initial start-up.

The generator in FIG. 2 includes three main parts: a cast metal body 50; a cap 51, also of cast metal; and an interior partition 52 separating a main chamber or capacity 53 from a second, upper chamber or cavity 54.

Body 50 includes an outer boss 55 onto which is screwed a connection 56 serving for the filling of capacity 53, an inner flange 57 which supports inner partition 52, and a lower boss 58, the inner surface of which includes two holes 59 and 60, within each of which is brazed a tube, respectively 61 and 62. Tube 61 connects main cavity 53 with upper cavity 54 and tube 62 connects said cavity 53 with venturi 2, with holes 61a and 62a provided at the lower end of said tubes 61, 62.

Cap 51 includes at its top, a boss 63 having a threaded hole 63a for receiving a tube 64 which supplies oil to the lubrication points, such as bearing 65 (see FIG. 3) and laterally, a boss 66 including a hole 67 into which is introduced venturi 2. The latter is fastened to cap 51 by means of a flange 68 and screws 69, which also join valve 4 to generator 50, 51, 52. Cap 51 and body 50 are made mutually integral by bosses and screws (not shown).

Interior partition 52 includes a cylindrical wall 70 in which are machined two grooves for receiving seal gaskets 71 and a central part 72 in the shape of a funnel communicating with tube 61. Such central part includes other holes, a diaphragm (or hole with a small diameter) 73 designed for pressurizing chamber 53, and a hole 74 designed for the passage of tube 62 (which feeds venturi 2) through partition 52.

In contrast to the previously described embodiment, the generator is continuously supplied with oil through connection 56, which communicates with the main oil circuit. Two cases are to be considered with regard to FIG. 3. In the first case, the generator has just been replaced. Capacities 53 and 54 are empty at the moment of initial start-up of the engine. Oil arrives through connection 56 as soon as the pumps (not shown) of the lubrication system are rotating. The oil rises through tube 61, fills capacity 54, then aerosol lubrication tube 64 serving bearing 65.

The oil reaches a maximum level A, from which point it flows into the enclosure of bearing 65 before being recovered by the pumps. When the engine is stopped, the oil is stabilized at level A.

In the second case, capacities 53 and 54 are full. At the moment of the next start-up, the generator is already full of oil. Oil from the engine heats the generator oil and the above cycle recommences.

The operation of the generator which has just been described is as follows. During normal operation of the engine lubrication system, valve 4 is closed. A flow drawn off from the main oil circuit supplies the generator continuously with oil. The entire container 50, 51 is full. An oil level A is established in the upper part of tube 64 which supplies aerosol mist to bearing 65.

Overflow oil flows into the area called the "forward container" found downstream of bearing 65. This overflow is recovered by the lubrication circuit pump (not shown) and returned to main oil reservoir R.

Under conditions of inverted or "negative g" flight, valve 4 is still closed. Two different oil levels B and C established such that level B is determined by aerosol nozzle 75 provided at the end of tube 64, level C is determined by openings 61a in large-drop recovery tube 61.

Upon return to normal flight position or conditions, the oil contained in downstream portion 64a of tube 64 falls into the forward container where it is recovered. The oil contained in upstream portion 64b is returned by gravity to generator 50, 51 through funnel 72.

At the moment of a breakdown in the main lubricating oil circuit, an indicator lamp lights up on the control panel. The pilot electrically controls the operation of the emergency "oil failure." Valve 4 opens and pressurizes the emergency oil failure circuit. The oil contained in head chamber 54 of generator 50, 51 is blown, lower chamber 53 of said generator is pressurized, and oil atomization occurs automatically.

Figure 3:
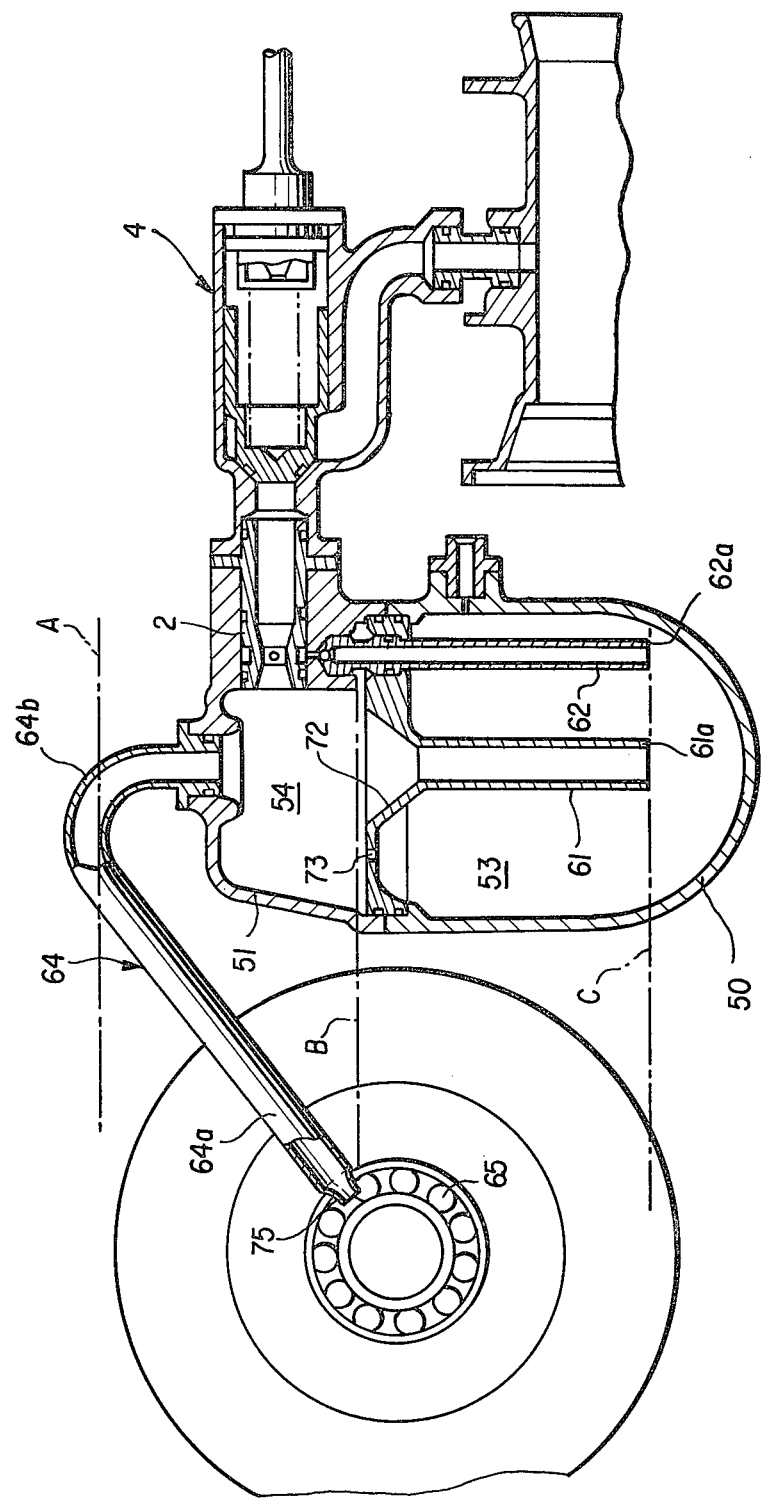
FIG. 3 is a vertical, cross-sectional schematic view of a lubrication unit using the device of FIG. 2.

Thus, according to the embodiment shown in FIGS. 2 and 3, the emergency reservoir is continuously supplied by the main lubrication system, which eliminates the need for heating the oil in said reservoir. A collector (funnel 72, tube 61) gathers and returns to said reservoir the oil which has flowed into lubrication tubing 64 of bearing 65 during inverted or "negative g" flight.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. Emergency aerosol lubrication device, particularly for an airborne engine, comprising:
    a closed reserve compartment for placing a certain quantity of oil in reserve,
    means for introducing oil into said reserve compartment, with a volume of air provided at the upper end of said reserve compartment,
    an aerosol container connected to lubrication points and disposed above and separated from said reserve compartment by a wall, at least a part of said wall being essentially oil-tight under low pressure so as to avoid drainage of oil out of said reserve compartment, and having a depression, at the lower point of which opens a recovery conduit for recovery of non-atomized oil, with said conduit communicating with said reserve compartment,
    controllable means supplied separately with air to atomize said oil in said aerosol container,
    an oil supply conduit operatively associated with said controllable means, opening into the lower part of said reserve compartment, and
    means for keeping the reserve oil at an appropriate temperature.

2. Device according to claim 1, wherein said reserve compartment further comprises upper and lower stacked chambers interconnected by a valve, said means for introducing oil into said reserve compartment opening into said lower chamber, and further comprising an oil line and a second valve disposed in said oil line wherein the upper chamber is connected to said aerosol container by said oil line, and wherein said first and second valves comprise a single clack valve, the opening of said valves being controlled by the activation of said controllable means.

3. Device according to claim 1, further comprising a communication line wherein the aerosol container communicates permanently with the upper end of said reserve compartment through said communication line having a cross-section which is sufficiently small to avoid substantial leakage from said reserve compartment in case of reversal of the direction of acceleration of gravity, with said communication line enabling said reserve compartment to be placed at the same pressure as the aerosol container so that movement of oil from said container to the atomization means in the feed tube is obtained.

4. Device according to claim 1 or 2, wherein said recovery conduit further comprises a liaison conduit opening into said aerosol container wherein said reserve compartment communicates permanently with said aerosol container through one end portion of said liaison conduit, and communicates permanently with the lower end of said reserve compartment at the opposite end portion of said liaison conduit, said reserve compartment being in series with said aerosol container and forming a branch of an oil circuit of said engine for maintaining said oil at a suitable temperature.

* * * * *